United States Patent Office 2,910,455
Patented Oct. 27, 1959

2,910,455

GLYCIDYL POLYETHERS FROM AN EPIHALO-HYDRIN AND A BIS(4-HYDROXY-3 ALLYL PHENYL) ALKANE

Roger M. Christenson, Richland Township, Pa., and William C. Bean, Schofield, Wis., assignors to Pittsburgh Plate Glass Company No Drawing. Application November 26, 1954
Serial No. 471,494

2 Claims. (Cl. 260—47)

This invention relates to a new polyepoxy resin and it has particular relation to polyepoxy resins which contain ethylenically unsaturated side chains attached to aromatic neuclei and being susceptible of oxidation and polymerization. These resins are characterized by good compatibility with petroleum hydrocarbon solvents and with many alkyd resins. Likewise, they form films of good adhesion, hardness, flexibility, and of good resistance to alkali. These properties, as well as other valuable properties, adapt them for use as coating media for surfaces of various materials including metals such as iron, steel, aluminum, copper or the like. The films are valuable both for decorative purposes and for protection of the surface to which they are applied.

It has heretofore been proposed to form polyether type resins by condensation of a polyhydric phenol and an epoxy compound. The resultant polyethers may be thought of as comprising alternating aliphatic groups and aromatic groups which are interconnected or bridged together by the ether linkages. The polyethers obtained by condensation of bis(hydroxyphenyl)alkanes and epichlorohydrin, or similar materials containing groups adapted to condense with the hydroxy groups of a phenol to form ether linkages, are outstanding examples of such materials. The resultant products are conventionally known as polyepoxy resins.

The polyepoxy resins of lower molecular weight, for example, those of an epoxide equivalent of about 200 to 400, are used as castings, in the potting of electrical coils and other devices, and as adhesives in the preparation of structural laminates and forms. The polyepoxy resins of higher molecular weight, for example, those with an epoxide equivalent of 400 to 4000, are used primarily as surface coatings. In such capacity, they have good adhesion and good chemical resistance; but they are also characterized by the disadvantages that they are insoluble in organic hydrocarbon solvents and are not readily compatible with alkyd resins. These disadvantages of the epoxy resins have hindered attempts to blend such resins with alkyd resins to obtain compositions possessing the desirable properties of both components. They are not polymerized by oxidation or addition of double bonds.

This invention involves the discovery that bis(hydroxyphenyl)alkanes, such as the so-called bisphenols, can readily be transformed into corresponding bis(hydroxyallylphenyl)alkanes and that the resultant unsaturated phenolic compounds can readily undergo condensation reactions, such as those which have heretofore been applied to the bis(hydroxyphenyl)alkanes to form glycidyl polyethers or ethoxyline resins. As contrasted with those heretofore available, these polyethers are of good solubility in relatively inexpensive hydrocarbon solvents and are of good compatibility with alkyd resins. The films formed from the new polyether products are of improved adhesion, flexibility and resistance to alkali.

The bis(hydroxyallylphenyl)alkanes of this invention, also contain one or more terminal ethylenic ($>C=CH_2$) groups which in the polyethers, are functional and are adapted to react by addition with ethylenic groups in contiguous molecules of the same or other compatible ethylenic compounds to effect cross-linking. Cross-linking may also be effected by oxidation of ethylenic groups to provide oxygen bridges. These changes can be expected to promote hardening and to increase the resistance of films of the material to the action of alkali. Cross-linking by addition or oxidation may occur in the blends of these with alkyds, such as those hereinafter disclosed.

While in its broader aspects, the present invention is not limited to any particular method of forming the new polyether resins or the primary or basic components entering into their composition, very successful techniques have been developed for the preparation of certain of the primary components and it is believed that it is in the interest of the advancement of the art briefly to describe them. In particular, the preparation of bis(hydroxyallylphenyl)alkane, such as 2,2-bis(4-hydroxy-3-allylphenyl)propane will be described. In this operation, 2,2-bis(4-hydroxyphenyl)propane, commonly known as Bisphenol A, is employed as a starting material. This is first converted into 2,2-(allyloxyphenyl)propane by reacting about 1 mole thereof with about 2 moles of allyl chloride in the presence of alkali. If products of very light color are desired, it is also desirable to include in the reaction mixture a small amount of a reducing agent, such as sodium hydrosulfite. If darker color is not objectionable, this reducing agent may be dispensed with.

The resultant bis(allyloxyphenyl)alkanes can readily be rearranged to form the corresponding bis (4-hydroxyallylphenyl)alkanes by application of heat, preferably in the presence of a solvent, such as xylene or the like.

The resultant products, consisting largely of bis(4-hydroxyallylphenyl)alkane can readily be condensed with materials, such as epichlorohydrin, in the presence of an alkali, such as aqueous sodium hydroxide, to form polyethers of improved characteristics. For purposes of recovery of the desired polyether resin product, the batch is acidified with appropriate acids, such as sulfuric acid, and butanol and xylene may be added in order to separate the mixture into a water and a resin layer which can be separated from each other by decantation or other suitable methods. Any acid remaining in the resin layer should be neutralized with a base, such as sodium carbonate. Water in the resin layer may be distilled off, and likewise, any excess of xylene may be distilled at a temperature extending up to approximately 300° F.

The resultant epoxy resin is inherently soluble in such solvents as xylene and is well adapted for coating metals and other materials. Likewise, it may be mixed with pigments, such as calcium carbonate, titanium dioxide, and many others, to provide a high degree of opacity or a desired color.

It is to be recognized that bis(hydroxyallylphenyl)-alkanes, which are only partially allylated, may be prepared by reacting 2,2-bis(hydroxyphenyl)alkanes, such as 2,2-bis(4-hydroxyphenyl)propane, with less than two moles of allyl chloride and rearranging the resultant ether. In this way, bis(hydroxyphenyl)alkane derivatives containing from 1 or less to 2 allyl groups per molecule may be prepared. The techniques, aside from the reduction of the proportion of allyl chloride in the reaction, are substantially the same as those employed in preparing the diallyl derivatives.

The partially allylated bis(hydroxyphenyl)alkanes can be reacted with epichlorohydrin to form polyethers which aside from the recurring allyl side chains are similar to common epoxy resins. The allyl groups do impart added degrees of functionality, though perhaps in a reduced degree as compared with the fully allylated compounds.

It is also permissible to mix one or more of the allylated bis(hydroxyphenyl)alkanes, such as 2,2-bis(4-hydroxy-3-allylphenyl)propane with an unallylated, or but partially allylated bis(hydroxyphenyl)alkane, such as 2,2-bis(4-hydroxyphenyl)propane in an amount varying from about 0.2 to 10 moles of the former to 1 mole of the latter and then to react the mixture with epichlorohydrin in the presence of alkali to form a mixed polyether having properties of any desired degree of intermediacy between the polyethers free of allyl groups and those which are fully allylated. These mixed polyethers can be used directly as coating media, or they can be blended with an alkyl resin and the blend can be spread as a film and baked to a hard, durable state.

In the preparation of the polyepoxy resins, containing allyl groups in accordance with the provisions of the present invention, it is permissible to employ a bis(allylhydroxyphenyl)alkane in a relatively wide range of proportions. Naturally, if the polyether product is to embody alternate aliphatic groups and bis(allylphenyl)-alkane groups formed by ether linkages, the molecular ratio of the reacted components will be 1 to 1. Chain length and the molecular weight may be varied by increasing or decreasing the molar ratio of the epichlorohydrin; maximum values are attained at approximately 1 to 1 ratio between the components. As the ratio of epichlorohydrin is increased or decreased from this proportion the chain length of the molecules is decreased.

Usually the reaction temperature is so controlled as to effect the evolution and removal of water of condensation and is continued until a desired molecular weight is attained. The epoxide equivalent of the product (as can be determined by conventional tests) constitutes a criterion of the course of the reaction and of the molecular weight. Usually the reaction is continued until an epoxy equivalency in a range of about 400 to 4000 is attained.

It is to be recognized that molecular weight is influenced by the manner and amount in which the epichlorohydrin or its equivalent is added to the reaction mixture.

The preparation of a bis(allyloxyphenyl)alkane suitable for conversion to a di(allylhydroxyphenyl)alkane in accordance with the provisions of the present invention, is illustrated by the following example.

*Example A*

In this example, 2,2-(4-hydroxyphenyl)propane (Bisphenol A) was employed as a starting material. This compound in an amount of 1150 grams (5 moles) and 5 grams of sodium hydrosulfite were partially dissolved in 400 grams (10 moles) of sodium hydroxide and 2000 milliliters of water in a 3 liter, 3 necked flask, equipped with a stirrer, a reflux condenser and a dropping funnel. Allyl chloride in an amount of 803 grams (10.5 moles) was added at such rate as to maintain a gentle reflux in the flask due to exothermal reaction. After the addition of the allyl chloride was completed, the mixture was heated on a steam bath for 6 hours.

The reaction mixture was acidified with dilute hydrochloric acid and the water layer was removed. Toluene was added to the residue. Water and solvent were removed by distillation from the resultant material in the flask to obtain a yield of 1505 grams of a product which was largely 2,2-bis(allyloxyphenyl)propane having a refractive index of 1.5652. This yield compares most favorably with a theoretical yield of 1550 grams.

The resultant ether, 2,2-bis(4-allyloxyphenyl)propane, was then subjected to rearrangement in order to form 2,2-bis(4-hydroxy-3-allylphenyl)propane. In the rearrangement, the ether compound above described was mixed with 500 milliliters of toluene and was heated to 180° C. in a three-necked, 5 liter flask equipped with a stirrer, an inlet for inert gas, an outlet for said gas, and a thermometer. The temperature was maintained for 6 hours and at the conclusion of the latter period, the toluene was distilled off under a reduced pressure. The product was 2,2-bis(4-hydroxy-3-allylphenyl)propane of an index of refraction of ($N_D^{25}$) 1.5840 and a hydroxy value of 335.

The foregoing compound is well adapted for reacting with agents, such as epichlorohydrin, to form an epoxy resin.

The material, of course, could be replaced by other di- and bis(hydroxyallylphenyl)alkanes in the ensuing condensation to form the improved epoxy resins of this application.

The following example illustrates the formation of such resins using the 2,2-bis(4-hydroxy-3-allylphenyl)-propane prepared as above described.

*Example I*

In this example, a flask equipped with a stirrer and a reflux condenser was employed as a reaction vessel. The charge comprised 715 grams (2.3 moles) of 2,2-bis-(4-hydroxy-3-allylphenyl)propane and 500 grams of aqueous alkali containing 123.2 grams of sodium hydroxide (3.08 moles), together with a small amount of sodium hydrosulfite as a reducing agent. The mixture was stirred until the 2,2-bis(4-hydroxy-3-allylphenyl)propane was in solution, which operation was expedited by application of heat. The mixture was cooled approximately to room temperature and 285 grams of epichlorohydrin was added and the mixture was then gradually heated on a steam bath until the initial heat of the reaction subsided and a pH of 8.0 was obtained.

At this stage, the reaction was deemed to be substantially complete, and a separation into an aqueous layer and a resin layer was effected. This separation was facilitated by adding from 500 to 8800 milliliters of toluene, stirring the mixture and then stopping the stirring operation and heating until separation into two layers is effected. The water layer was drawn off.

The resin layer was then acidified by treating it with carbon dioxide until the mixture becomes substantially neutral. The resin product was stripped of traces of water by distilling under an azeotropic separator while the mixture was agitated until all of the water was removed. The solution of epoxy resin in toluene was then filtered and toluene was distilled until a desired solids content was attained. If desired, distillation may be continued until all of the toluene is removed.

The product was of an epoxide equivalent of 515 against a calculated value of 574. The Gardner viscosity of the solution of 80 percent resin content in toluene was R. This material is suitable for coating iron or steel and baking to provide tough, flexible, adherent films. It can also be incorporated with alkyd resins by cold blending or by other techniques to provide useful modified resin compositions.

A valuable polyepoxy resin comprising 2,2-bis(4-hydroxy-3-allylphenyl)propane and epichlorohydrin as starting ingredients and being of low molecular weight, was prepared as follows:

*Example II*

The reaction charge comprised:

2,2 - bis(4 - hydroxy - 3 - allyl-
  phenyl)propane _____ 404 grams (1.32 moles).
Epichlorohydrin _____ 610 grams (6.6 moles).
Sodium hydrosulfite_____ 1 gram.
Water (containing 1 gram sodi-
  um hydrosulfite)_____ 10 cc.

The reaction vessel utilized was a flask equipped with a stirrer, a reflux condenser, a thermometer and an addition tube. The mixture was heated to 90° C. and 105 grams of sodium hydroxide in the form of pellets was added over a period of 1 hour.

The excess of epichlorohydrin and water was distilled off under an azeotropic separator and 500 milliliters of toluene was added. Subsequently, the mixture was filtered and stripped of solvents after which it was refiltered under vacuum with Celite as a filter aid. A yield of 510 grams of epoxide resin having an epoxide equivalent of 270 was obtained. This material also could be employed as a coating agent and likewise could be combined with alkyd resins and utilized as a coating agent.

The preparation of an epoxy resin of higher molecular weight is illustrated by the following example.

*Example III*

The charge in this instance comprised:

| | |
|---|---|
| 2,2 - bis(4 - hydroxy - 3 - allylphenyl)propane | 616 grams (2 moles). |
| Sodium hydroxide | 80 grams. |
| Sodium hydrosulfite | 1 gram. |
| Water | 300 milliliters. |
| Toluene | 500 grams. |
| Epichlorohydrin | 186 grams (2 moles). |

In the reaction, the epichlorohydrin was added slowly to the other ingredients in a flask having a stirrer and a reflux condenser, and being heated on the steam bath. The reaction was allowed to continue for 8 hours. The reaction product was of a pH value of 11.0 to 12.0. The mixture was allowed to separate into two layers on the steam bath and the water layer was then removed. The resin layer was subjected to distillation under an azeotropic separator attached to a condenser until all of the water was removed. The resultant product was filtered with Celite as an aid. A yield of 612 grams of resin was obtained. The epoxide equivalency of the product was 3580, the Gardner viscosity was Z—4, at a solids content of 80 percent in toluene. This product was also useful as a coating medium. It was compatible with alkyd resins, toluene solutions thereof, with or without addition of alkyd, could be employed for coating operations.

The following example is illustrative of the preparation of an epoxy resin from 2,2-(4-hydroxy-3-allylphenyl)propane and epichlorohydrin on a larger scale.

*Example IV*

The charge comprised:

| | Pounds |
|---|---|
| Alkali | 7 |
| Water | 44.3 |
| 2,2-(4-hydroxyphenyl)propane | 20.15 |

The foregoing materials were charged into a 10 gallon reactor. The 2,2-(4-hydroxyphenyl)propane being added slowly to the water and the alkali to make a homogeneous solution. When the latter was formed, 39.7 grams of sodium hydrosulfite was added as a reducing agent to prevent darkening. The reactor was then sealed and 13.40 pounds of allyl chloride was slowly added. At this stage the heat was turned on and the batch was slowly heated to 212° F. The batch was maintained under total reflux for 1 hour at 212° F. and was then acidified to a pH of 3 with 68 percent aqueous sulfuric acid. The salt-water layer was separated out and drawn off. The reaction product was 2,2-(diallyloxyphenyl)propane and was obtained in an essentially theoretical yield.

Two additional batches of the diallyl ether of diphenyl propane also were prepared with theoretical yields.

For purposes of converting the foregoing ether products into 2,2 - bis(4 - hydroxy-3-allylphenyl)propane, a charge was prepared comprising:

| | Pounds |
|---|---|
| 2,2-bis(allyloxyphenyl)propane | 85.2 |
| Xylene | 5 |
| Sodium carbonate | 0.5 |

The sodium carbonate was added to the bath to neutralize any traces of sulphuric acid present. The batch was then heated to a temperature of 355° F. under a reflux condenser equipped with a water separator filled with xylene for 6 hours. Any water in the batch was thus removed. During the course of the heating operation, samples of material were taken at 2 hours and again at 4 hours, and were checked for solids content and refractive index as well as hydroxy number. The rearrangement is continued until the refractive index of the product rises to a maximum. The final hydroxy value of the product free of solvent was 334. At the conclusion of the heating operation the charge was cooled to 90° F. and was subjected to a similar analysis.

The yield of 2,2-bis(4-hydroxy-3-allylphenyl)propane was 79 pounds at a solids content of 83.85 percent.

The foregoing material was divided into two parts and each part was made into a batch of the following composition:

| | |
|---|---|
| 2,2 - bis(4-hydroxy-3-allylphenyl)propane_pounds_ | 36.9 |
| Sodium hydroxide_____do____ | 3.6 |
| Water _____do____ | 15.1 |
| Sodium hydrosulfite_____grams__ | 22.8 |

The foregoing charge was agitated in the container for 15 minutes and then 8.80 pounds of epichlorohydrin was added over a 15 minute period. The heat was then turned on and the batch was subjected to total reflux at a temperature of 225° F. for 8 hours. The batch was then acidified to a pH of about 5 with about 68 percent of aqueous sulfuric acid.

In order to effect separation of the reaction product into a water and a resin layer, the following materials were added:

| | Pounds |
|---|---|
| Xylene | 8.44 |
| Butanol | 7.50 |
| Water | 11.40 |

The batch was agitated a few minutes and was held in the reactor to allow the two layers to separate. The salt-water layer was then drawn off and discarded.

A yield of 59 pounds of polyepoxy resin was obtained and this was treated with 0.3 pounds of sodium carbonate for purposes of neutralizing any sulfuric acid present. The batch was heated until a pot temperature of 300° F. was attained. During this step, water present in the resin was distilled off. The product as finally obtained was of a viscosity of Z. It was then cooled to 150° F. and filtered. The weight of the filtered resin was 40.5 pounds. The characteristics of the finished resins were as follows:

| | |
|---|---|
| Total solids _____percent__ | 77.8 |
| Viscosity | X–Y |
| Color | 7–8 |
| Epoxide equivalent | 1400 |
| Hydroxyl value | 249 |

The actual yield of resins solids was 36.6 pounds. This resin was useful as medium for coating iron, steel and the like and could be blended with alkyd resins as in the examples to follow to provide resins which when spread as films and baked were of greater hardness and durability than the modified alkyd.

The following examples illustrate the blending of polyepoxy resins comprising 2,2-bis(4-hydroxy-3-allylphenyl)propane of relatively low epoxide equivalency, with a soya oil modified alkyd resin of baking grade in order to provide a coating composition which could be spread upon a surface and baked to provide films of good hardness, flexibility, impact resistance, and high resistance to alkali.

*Example V*

In this example an epoxy resin 2,2-(4-hydroxy-3-allylphenyl)propane and epichlorohydrin leaving an epoxide equivalent of 450 was employed. The alkyd resin was of the baking type and was a fusible, soluble phthalic glyceride modified with soya oil of the following proportions:

| | Percent |
|---|---|
| Soya oil | 48.7 |
| Phthalic anhydride | 35.6 |
| Pentaerythritol | 20.0 |

This resin was cut to 50 percent solids with petroleum naphtha.

The alkyd resin and the polyepoxide resin were cold blended to provide a solution comprising equal parts of the components. The solution of resins was applied as a film to a surface of sheet metal and was baked at 350° F. until hard. The film obtained was excellent.

For purposes of comparison, a second panel was similarly prepared but in this instance, the coating material comprised only the alkyd component above described. In each instance the films were baked for 30 minutes. The films were then subjected to tests for hardness, impact resistance, flexibility and alkali resistance to solutions of sodium hydroxide. The results of these tests are tabulated as follows:

| | Alkyd | Alkyd plus epoxy resin |
|---|---|---|
| Sward hardness | 24 | 26-28. |
| Impact resistance | 48 | 36-48. |
| Flexibility | Good | Good. |
| Alkali resistance | 46 hours | 100 hours (excellent). |

The alkali resistance of the blended composition was much superior to that of the alkyd composition and the sward hardness, impact resistance and flexibility was substantially the same.

Alkyds modified with acids of other oils, such as linseed oil, could be employed in this example.

In the preceding examples, 2,2-bis(4-hydroxyphenyl)-propane, was employed as a starting component in the preparation of a bis(hydroxyallylphenyl)alkane. It will be recognized that many other di-bis(hydroxyphenyl)-alkanes suitable for reaction with epichlorohydrin or other compounds designed to form polyepoxy resins may be employed as the phenolic component. These can be reacted with allyl chloride in the presence of alkali to form bis(allyloxyphenyl)alkanes which when heated, rearrange to form bis(hydroxyallylphenyl)alkanes suitable for reacting with epichlorohydrin to form polyethers. The following constitutes a partial list of a few of the available materials:

Bis(4-hydroxyphenyl)1,1-propane
Bis(4-hydroxyphenyl)1,1-ethane
Bis(4-hydroxyphenyl)1,1-butane
Bis(4-hydroxyphenyl)2,2-butane
Bis(4-hydroxyphenyl)2,2-propane
Bis(4-hydroxy-tertiary butyl phenyl)2,2-propane and various others. The resultant bis(hydroxyallylphenyl)-alkane, obtained from reaction of an epihalohydrin and the foregoing bisphenol compounds, may be designated as $x,x$-bis(4-hydroxy-3-allylphenyl)alkanes were in the alkane group contains from 2 to 4 carbon atoms and "$x$" is a number from 1 to 2, indicating that the two 4-hydroxy-3-allylphenyl groups are on a single carbon atom in the alkane chain and also the position of said carbon atom in said chain.

Other methods of forming bis(hydroxyallylphenyl)-alkanes can be employed. Likewise, epichlorohydrin may be replaced by other compounds adapted to react with allyl substituted bisphenols to form the polyepoxy resins. A partial list of such compounds includes:

1-chloro-2,3-epoxy butane
1-chloro-3,4-epoxy butane
2-chlor-3,4-epoxy butane
1-chloro-2-methyl-2,3-epoxy butane
1-bromo-2,3-epoxy pentane
2-chloromethyl-1,2-epoxy butane
1-bromo-4-methyl-3,4-epoxy pentane
1-bromo-4-ethyl-2,3-epoxy pentane
4-chloro-2-methyl-2,3-epoxy pentane
2-chloro-2,3-epoxy octane
1-chloro-2-methyl-2,3-epoxy octane
1-chloro-2,3-epoxy decane It is to be recognized that the polyepoxy resins from the allyl bisphenol compounds and the chloroepoxides of this application are capable of the various reactions characterizing the epoxy resins which are free from the allyl groups as side chains in the benzene rings. For example the resins may be insolubilized with various cross-linking agents, such as urea-formaldehyde, melamine-formaldehyde and phenol-formaldehyde resins or with hardening agents, such as the amines, e.g. diethylenetriamine, or dicyanamide, and various others. The polyethers may also be cross-linked with dicarboxylic acids, such as oxalic acid and others. They may also be esterified by fatty acids, such as soya oil acids or linseed oil acids. They, or their derivatives, such as their fatty acid derivatives, may be incorporated with oil modified alkyd resins, with heat convertible phenol-formaldehyde resins, urea-formaldehyde resins, melamine resins, and in general are amenable to many or all of the modification techniques of conventional epoxy resins. In addition, they are capable of reactions involving the ethylenic group in the side chain, as herein disclosed.

The polyepoxy resins may be employed for coating metals, such as iron or steel which are susceptible of being baked, but they may also be employed to coat various other materials which are adapted to withstand the temperatures employed in the baking operation.

The use of the materials is not limited to the coating art. They may also be employed to impregnate mats or bats of fibrous materials, such as fiber glass and other materials, or may be used as potting compounds.

The forms of the invention herein given are to be considered as being by way of illustration. It will be apparent to those skilled in the art that numerous modifications may be made therein without departure from the spirit of the invention or from the scope of the appended claims.

We claim:
1. As a new material, a glycidyl polyether resulting from the reaction of 2,2-bis(4-hydroxy-3-allylphenyl)-propane and epichlorohydrin.
2. As a new material a glycidyl polyether resulting from the reaction of an epihalohydrin and an $x,x$-bis(4-hydroxy-3-allylphenyl)alkane wherein the alkane group contains about 2 to 4 carbon atoms and "$x$" is a number from 1 to 2 designating the position of a single carbon atom in the alkane chain to which the 4-hydroxy-3-allylphenyl groups are both attached.

References Cited in the file of this patent

UNITED STATES PATENTS

| | | |
|---|---|---|
| 2,464,753 | Shokal et al. | Mar. 15, 1949 |
| 2,515,906 | Stevens et al. | July 8, 1950 |
| 2,602,822 | Schwarzer et al. | July 8, 1952 |
| 2,691,004 | Doyle | Oct. 5, 1954 |
| 2,691,007 | Cass | Oct. 5, 1954 |
| 2,694,694 | Greenlee | Nov. 16, 1954 |
| 2,698,315 | Greenlee | Dec. 28, 1954 |
| 2,712,535 | Fisch | July 5, 1955 |

UNITED STATES PATENT OFFICE

CERTIFICATE OF CORRECTION

Patent No. 2,910,455                                October 27, 1959

Roger M. Christenson et al.

It is hereby certified that error appears in the printed specification of the above numbered patent requiring correction and that the said Letters Patent should read as corrected below.

Column 4, line 4, for "$N_D^{25}$" read -- $N^{25}D$ --; column 8, line 63, list of References Cited, under UNITED STATES PATENTS, for "July 8, 1950" read -- July 18, 1950 --; line 65, list of References Cited, under UNITED STATES PATENTS, for "Oct. 5, 1954" read -- Oct. 14, 1954 --.

Signed and sealed this 13th day of September 1960.

(SEAL)
Attest:

KARL H. AXLINE
Attesting Officer

ROBERT C. WATSON
Commissioner of Patents